(12) United States Patent
Mihatsch et al.

(10) Patent No.: US 9,546,710 B2
(45) Date of Patent: Jan. 17, 2017

(54) PROCEDURE FOR ENGAGING A FORM-LOCKING SHIFT ELEMENT TO REALIZE A GEAR IN AN AUTOMATIC TRANSMISSION, WHEREAT AT LEAST ONE FURTHER FRICTION SHIFT ELEMENT IS TO BE ENGAGED TO REALIZE THE GEAR TO BE ACTIVATED

(71) Applicant: ZF Friedrichshafen AG, Friedrichshafen (DE)

(72) Inventors: Georg Mihatsch, Lindau (DE); Andreas Schmidt, Bavendorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 410 days.

(21) Appl. No.: 14/195,896

(22) Filed: Mar. 4, 2014

(65) Prior Publication Data

US 2014/0290404 A1    Oct. 2, 2014

(30) Foreign Application Priority Data

Mar. 28, 2013   (DE) .................. 10 2013 205 564

(51) Int. Cl.
*B60W 10/02* (2006.01)
*B60W 10/04* (2006.01)
(Continued)

(52) U.S. Cl.
CPC ............ *F16H 3/38* (2013.01); *F16H 61/0403* (2013.01); *F16H 2061/0407* (2013.01); *F16H 2061/0474* (2013.01); *Y10T 74/19242* (2015.01)

(58) Field of Classification Search
CPC ................. F16H 2200/2064; F16H 2200/2094
See application file for complete search history.

(56) References Cited

U.S. PATENT DOCUMENTS 8,394,000 B2   3/2013   Popp et al.
8,465,394 B2   6/2013   Cuppers et al.
(Continued)

FOREIGN PATENT DOCUMENTS

DE   10 2008 001 566 A1   11/2009
DE   10 2009 028 305 A1   2/2011
(Continued)

OTHER PUBLICATIONS

German Search Report Corresponding to 10 2013 205 564.1 mailed Nov. 21, 2013.

*Primary Examiner* — Tisha Lewis
(74) *Attorney, Agent, or Firm* — Davis & Bujold, PLLC; Michael J. Bujold

(57) ABSTRACT

A method of engaging a form-interlocking shifting element to obtain a gear in an automatic transmission in which at least one further, frictional shifting element is involved in obtaining the gear to be engaged and a shifting element, not involved in obtaining the gear to be engaged but which serves as a synchronizing shifting element, is actuated in order to synchronize the interlocking shifting element to be engaged. The further, frictional shifting element, involved in engaging the gear, is engaged and then disengaged, to a defined extent, to bring the frictional shifting element to a slipping condition, in order to ensure the engagement of the interlocking shifting element.

9 Claims, 1 Drawing Sheet

(51) Int. Cl.
*F16H 3/38* (2006.01)
*F16H 61/04* (2006.01)

(56) References Cited

U.S. PATENT DOCUMENTS

| | | | |
|---|---|---|---|
| 8,500,601 B2* | 8/2013 | Arnold | F16H 61/0403 475/303 |
| 2011/0263382 A1* | 10/2011 | Arnold | F16H 61/0403 477/121 |
| 2013/0196814 A1 | 8/2013 | Gumpoltsberger et al. | |
| 2013/0268169 A1* | 10/2013 | Arnold | F16H 61/68 701/58 |
| 2014/0182415 A1* | 7/2014 | Griesmeier | B60K 6/365 74/661 |

FOREIGN PATENT DOCUMENTS

| | | |
|---|---|---|
| DE | 10 2009 056 793 A1 | 6/2011 |
| DE | 10 2010 000 858 A1 | 7/2011 |
| DE | 10 2010 042 656 A1 | 4/2012 |

\* cited by examiner

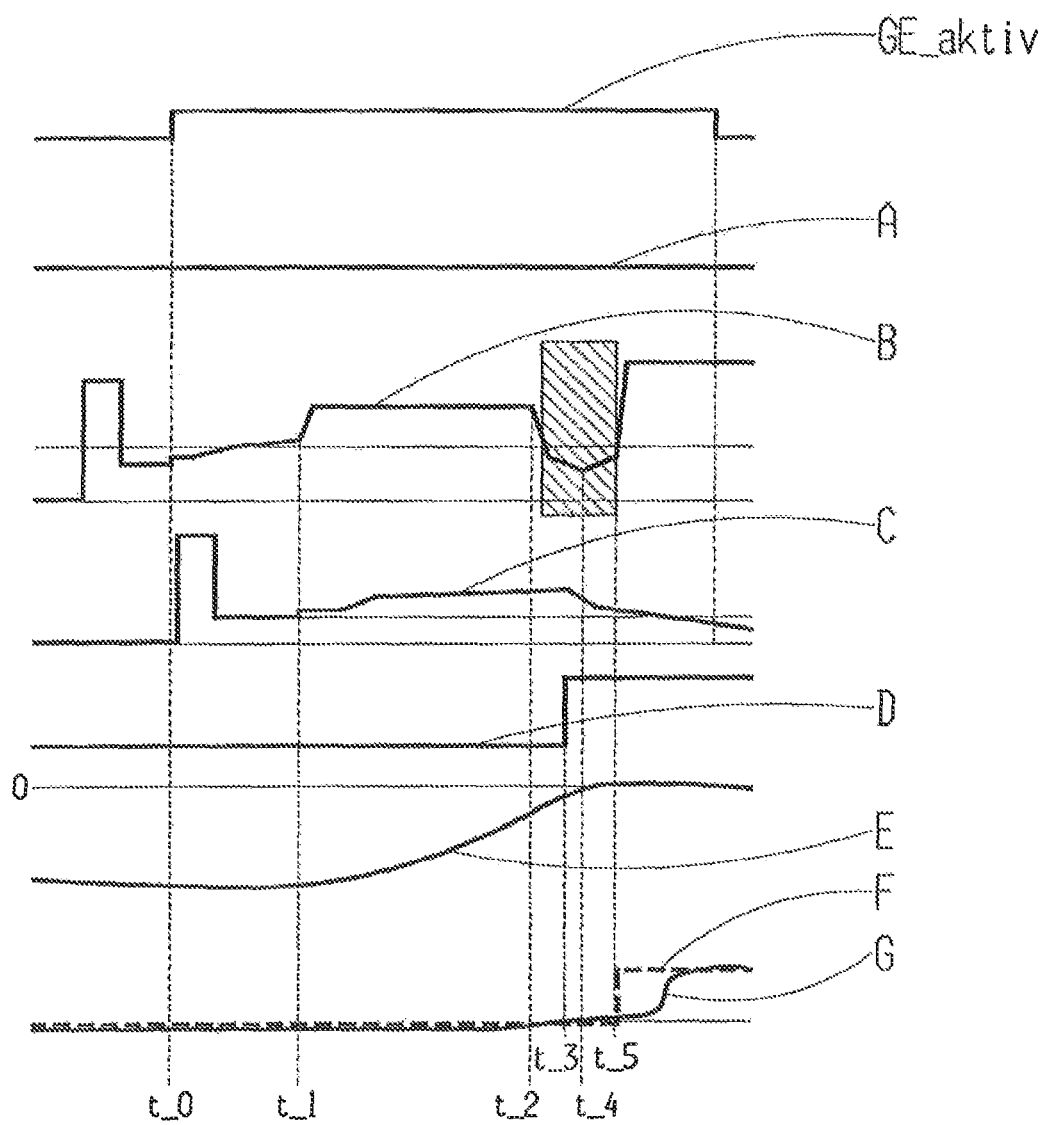

PROCEDURE FOR ENGAGING A FORM-LOCKING SHIFT ELEMENT TO REALIZE A GEAR IN AN AUTOMATIC TRANSMISSION, WHEREAT AT LEAST ONE FURTHER FRICTION SHIFT ELEMENT IS TO BE ENGAGED TO REALIZE THE GEAR TO BE ACTIVATED

This application claims priority from German patent application serial no. 10 2013 205 564.1 filed Mar. 28, 2013.

FIELD OF THE INVENTION

The present invention concerns a method for engaging a form-locking shift element to realize a gear in an automatic transmission, whereat at least one further, friction shift element is to be engaged to realize the gear to be activated.

BACKGROUND OF THE INVENTION

During gear engagement processes in automatic transmissions in which a form-locking shift element to be engaged has to be synchronized and at least one other, frictional shift element is involved, according to the prior art an additional shift element, which is not involved in the gear to be engaged but which serves as a synchronizing shift element is actuated so as to synchronize the form-locking shift element to be engaged. Disadvantageously, when the form locking shift element is engaged, then although the synchronizing shift element has already been disengaged torque is present at the form locking shift element which can prevent the claws of the form locking shift element to be engaged from being pushed fully home to their end position.

SUMMARY OF THE INVENTION

The objective of the present invention is to provide a method for engaging a form-locking shift element to obtain a gear in an automatic transmission, wherein at least one further, frictional shift element is involved in obtaining the gear to be engaged and a shift element not involved in the gear to be engaged but which serves as a synchronizing shift element is actuated in order to synchronize the form locking shift element to be engaged, by carrying out which method the torque present at the form locking shift element to be engaged once the synchronizing shift element has been disengaged, is reduced.

Accordingly, a method is proposed for engaging a form-locking shift element to obtain a gear in an automatic transmission, wherein at least one further, frictional shift element is involved in obtaining the gear to be engaged and a shift element not involved in the gear to be engaged but which serves as a synchronizing shift element is actuated in order to synchronize the form locking shift element to be engaged, in this method a further, frictional shift element involved in the gear engagement is closed and then opened to a defined extent such that it operates with slip in order to ensure the engagement of the form locking shift element.

During this a further, frictional shift element not directly needed for synchronization but involved in the gear engagement is brought to its current transmission limit plus a pressure offset, so that the rotational speed difference at the shift element is zero. Depending on the engagement timepoint of the claws of the form locking shift element to be engaged, the pressure at the further frictional shift element is reduced in such manner that slip can take place at the shift element. In this way the torque at the claws of the form locking shift element to be engaged is reduced, whereby the claws can be pushed fully home to their end position.

When the fully interlocked condition is recognized by an appropriate sensor system, the further frictional shift element is closed completely. If no sensor system for recognizing full interlock has been provided, then the further frictional shift element is closed completely after a specified time interval following the moment when the pressure reduction begins.

BRIEF DESCRIPTION OF THE DRAWINGS

Below, an example of the invention will be explained in more detail with reference to the sole FIGURE which shows, in each case as functions of time, the pressure variation at the form locking shift element to be engaged, at the further, frictional shift element, at the synchronizing shift element and at a third shift element involved, as well as the variation of the rotational speed difference at the form locking shift element to be engaged and the torque variation at the form locking shift element to be engaged, according to the prior art and in the method according to the invention, again as functions of time.

DETAILED DESCRIPTION OF THE PREFERRED EMBODIMENTS

In the attached FIGURE, A represents the time variation of the pressure at a third shift element which is involved in obtaining the gear; this shift element is already closed. Curve B shows the time variation of the pressure at the further, frictional shift element involved in obtaining the gear, whereas curve C shows the time variation of the pressure at the synchronizing shift element and curve D shows the time variation of the pressure at the form locking shift element to be engaged. Curves F and G show the time variations of the torque at the form locking shift element to be engaged, respectively in the prior art and in the method according to the invention.

At time $t\_0$ the process for engagement of the form locking shift element is initiated (curve GE_aktiv), and in order to synchronize the form locking shift element a synchronizing shift element, which is not needed for the gear to be engaged, is filled and closed, which happens at time $t\_1$ (curve C). At the same time $t\_1$ the pressure is increased at a further frictional shift element, one which is not directly needed for synchronization but is involved in engaging the gear (curve B), until it is brought to its current transmission limit plus a pressure offset, whereby the rotational speed difference at that shift element becomes zero. This pressure is maintained until time $t\_2$.

Between times $t\_1$ and $t\_2$ the pressure at the synchronizing shift element increases and the rotational speed difference between the claws of the form locking shift element to be engaged is reduced.

At time $t\_2$, the pressure in the further frictional shift element is reduced in such manner that slip can take place in that shift element, and then, at time $t\_3$, the pressure at the form locking shift element to be engaged is increased in order to engage the form locking shift element. The time $t\_2$ can be determined either from the synchronization duration of the form locking shift element or with reference to the signal from a position sensor which detects the position of the claws of the form locking shift element.

The rotational speed difference between the claws of the form locking shift element is reduced farther, and reaches zero at a time $t\_4$ when the pressure at the further frictional shift element reaches a minimum, namely zero. In this way the torque at the claws of the form locking shift element to be engaged (curve G) is reduced by comparison with the prior art (curve F), so enabling the claws to be pushed fully home to their end position. During this the synchronizing shift element is disengaged.

The further frictional shift element is fully closed when the end position of the claws of the form locking shift element is recognized by an appropriate sensor system; in the example shown in the attached FIGURE this takes place at time t_5. In the case when no sensor system has been provided for recognizing the end position, the further frictional shift element is closed completely after a specified time interval following the beginning of pressure reduction in the further frictional shift element, and the torque at the claws of the form locking shift element then increases.

INDEXES

A Time variation of the pressure at a third shift element, which is involved in obtaining the gear
B Time variation of the pressure at the further frictional shift element, which is involved in obtaining the gear
C Time variation of the pressure at the synchronizing shift element
D Time variation of the pressure at the form locking shift element to be engaged
E Time variation of the rotational speed difference at the form locking shift element to be engaged
F Time variation of the torque at the form locking shift element to be engaged, according to the prior art
G Time variation of the torque at the form locking shift element to be engaged, according to the present invention

The invention claimed is:

1. A method of engaging a form-locking shifting element to obtain a gear in an automatic transmission, and at least one further, frictional shifting element being involved in obtaining the gear to be engaged, the method comprising the steps of:
   actuating a shifting element not involved in obtaining the gear to be engaged, and the shifting element, not involved in obtaining the gear to be engaged, serving as a synchronizing shifting element in order to synchronize the form-locking shifting element to be engaged; and
   engaging the further, frictional shifting element involved in engaging the gear, and then
      disengaging the further frictional shifting element such that the further, frictional shifting element operates with slip,
   in order to ensure engagement of the form-locking shifting element.

2. The method of engaging the interlocking shifting element according to claim 1, further comprising the steps of:
   bringing the further, frictional shifting element, involved in engaging the gear, to a current transmission limit plus a pressure offset such that a rotational speed difference at the further, frictional shifting element becomes zero, and
   as a function of a time-point at which claws of the form-locking shifting element to be engaged engage, reducing a pressure at the further, frictional shifting element such that slip can occur at the further, frictional shifting element to reduce torque at the claws of the form-locking shifting element to be engaged thereby enabling the claws to be pushed fully home into an end position.

3. The method of engaging the interlocking shifting element according to claim 2, further comprising the step of determining the time-point when the pressure is reduced at the further, frictional shifting element either from a synchronization duration of the form-locking shifting element, or with reference to signals from a position sensor which detects the position of the claws of the form-locking shifting element.

4. The method of engaging the interlocking shifting element according to claim 2, further comprising the step of fully engaging the further, frictional shifting element when a sensor system recognizes the end position of the claws of the form-locking shifting element.

5. The method of engaging the interlocking shifting element according to claim 2, further comprising the step of fully engaging the further, frictional shifting element, after a specified time interval, following a beginning of pressure reduction in the further, frictional shifting element.

6. A method of engaging a form-locking shift element so as to implement a target gear in an automatic transmission that comprises first, second, third and fourth shift elements, the first shift element is the form-locking shift element, the second shift element is a frictional shift element and the fourth element is a synchronizing shift element, and the first, the second, and the third shift elements are engaged and the fourth shift element is disengaged in the target gear, the method comprising the steps of:
   actuating the fourth shift element to synchronize the first shift element;
   engaging the second shift element and subsequently disengaging the second shift element such that the second shift element operates with slip to ensure engagement of the first shift element;
   adjusting the second shift element to a current transmission limit plus a pressure offset so that a rotational speed difference at the second shift element becomes zero; and
   reducing pressure at the second shift element, as a function of a time-point at which claws of the first shift element engages, such that the second shift element operates with slip to reduce torque at the claws of the first shift element and enable the claws of the first shift element to be biased into a fully engaged end position.

7. The method of engaging the form-locking shift element according to claim 6, further comprising the step of determining a time-point when the pressure at the second shift element is reduced based on either a synchronization duration of the first shift element or signals of a position sensor which detects a position of the claws of the first shift element.

8. The method of engaging the form-locking shift element according to claim 7, further comprising the step of fully engaging the second shift element when the position sensor detects that the claws of the first shift element are in an end position.

9. The method of engaging the form-locking shift element according to claim 7, further comprising the step of fully engaging the second shift element, after a specified time interval, following a start of reducing pressure the second shift element.

* * * * *